June 21, 1955  V. L. FISHER  2,711,194
ADJUSTABLE GUIDE FOR POWER SAWS
Filed Feb. 20, 1953

INVENTOR.
Victor L. Fisher
BY
McMorrow, Berman & Davidson
Attorneys.

United States Patent Office 2,711,194
Patented June 21, 1955

2,711,194
ADJUSTABLE GUIDE FOR POWER SAWS
Victor L. Fisher, Evansville, Ind.
Application February 20, 1953, Serial No. 338,009
4 Claims. (Cl. 143—6)

This invention relates to saw guides, and more particularly, has reference to a guide particularly adapted for association with portable electric saws, the guide being designed to permit the sawing of a piece of wood stock at any desired angle relative to the longitudinal center line of said stock.

Summarized briefly, the invention includes a base on which is tiltably mounted a parallelogram frame. The side and end members of the frame are pivotally connected to one another, for adjustment of said members to any of various angles relative to one another. The end members of the frame have longitudinal extensions providing guide edges for a power saw, and on adjustment of the parallelogram frame to a selected position, the power saw, when traversing a piece of wood stock, will cut the stock at a desired angle. Protractor means is provided upon the frame, for fixing accurately the angle which the side members of the frame are to bear to the end members, and also carried by the frame is a clamp means which is adapted to be shifted into a work-engaging position when the frame is tilted downwardly upon the base onto a piece. The invention further includes a straight edge slidably adjustable upon one of the end members of the frame, and extending normally to its associated end member, for making bird's mouth cuts.

An important object of the present invention is to provide a generally improved saw guide of the character referred to, which can be manufactured at lower cost than other power saw guides of which I have knowledge, but which will be wholly accurate in operation.

Another object of importance is to provide a saw guide of the character referred to which can be adjusted to a selected position relative to the work piece in a minimum amount of time, and with maximum facility.

Yet another object is to provide a saw guide as stated which can be swung into and out of an operative position with minimum difficulty, thereby to permit the feeding of the work pieces to be carried out expeditiously.

Still another object is to provide a saw guide as stated which, when once set, will not have its adjustment destroyed when being swung into and out of operative relationship to work pieces. In this way, it is proposed to so design the invention as to permit a maximum number of work pieces to be cut identically to one another, in a minimum amount of time, thereby reducing labor expenses to a minimum.

Yet another object is to provide a saw guide as described which can be manufactured at low cost, so as to make the same commercially feasible for purchase by home craftsmen.

Other objects will appear from the following description, the claims appended thereto, and from the annexed drawing, in which like reference characters designate like parts throughout the several views, and wherein:

Figure 1:
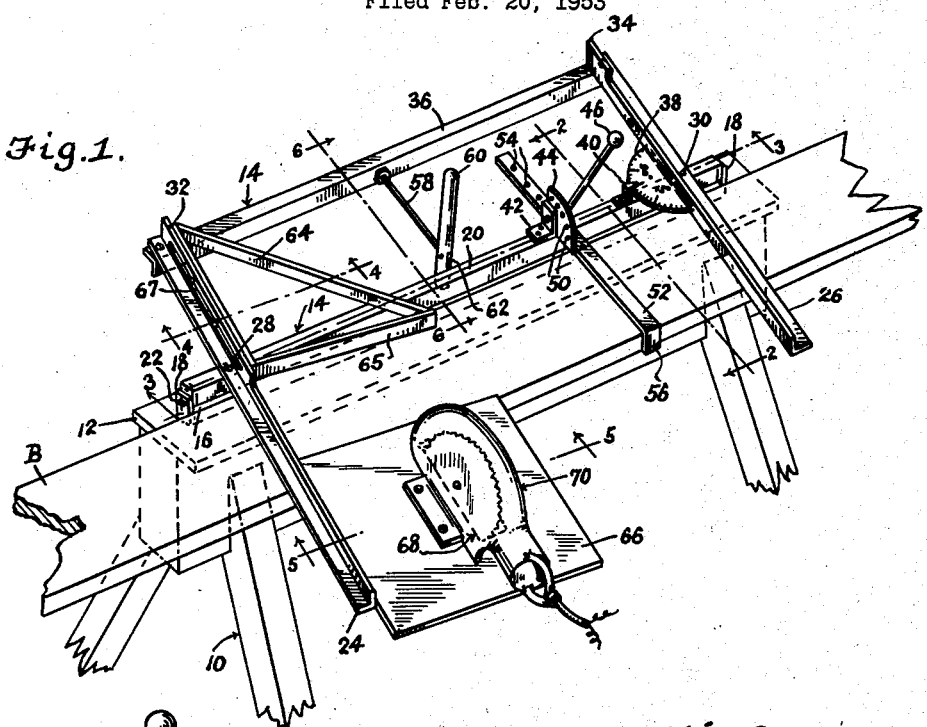
Figure 1 is a perspective view of a power saw guide formed in accordance with the present invention, a piece of wood stock being illustrated fragmentarily, the invention being shown in operative relationship to a power saw.

The portable and adjustable power saw guide constituting the present invention is adapted to be mounted upon a conventional saw horse or trestle 10. Preferably, there is secured to the body of said horse a flat, relatively wide board 12, which is adapted to afford a support for a board B to be cut.

The invention has been designated generally at 14, and includes an elongated, channeled base 16 having upwardly projecting end walls 18. Extending between the end walls, and disposed above and in parallelism with the base, is the inner side member 20 of the adjustable parallelogram frame incorporated in the invention, which frame will be described in detail hereinafter. The inner side member 20 of the frame is also (see Figure 2) formed of channel material, the channel of said inner side member facing downwardly.

Coaxially aligned pivot pins 22 extend through the end walls 18, and through the adjacent end walls of the inner side member 20, and thus, the inner side member is pivotally connected to the base 16 for tilting about a pivot axis extending longitudinally and centrally of said inner side member.

The parallelogram frame also includes end members 24, 26 respectively, said end members being preferably formed of angle iron material. The end members are connected by pivot pins 28, 30 to the respective end portions of the inner side member 20, for swinging movement about axes normal to the pivot axis defined by pins 22.

At one end, the end member 24 has its upstanding side wall increased in height as at 32, the end member 26 being also provided with an upwardly extending side wall portion 34. The portion 34 is, as will be noted from Figure 1, shorter in length than the portion 32 of member 24.

Extending between those ends of the end members 24, 26 having the portions 32, 34 is an outer side member 36 extending in parallelism with the inner side member 20. The end members 24, 26 are also in parallel relation to one another, and are connected to the ends of outer side member 36 by means of pivot pins.

It will thus be seen that a parallelogram frame is defined by end members 24, 26 and side members 20, 36, which frame can be adjustable as to the angular relationship which the side members bear to the end members.

Means is provided for accurately determining the angular relationship of the side to the end members, said means including a protractor segment 38 having degree markings thereon, said segment 38 being fixedly secured to the inner edge of the end member 26. An index arm 40 overlies the degree-marked edge of the segment 38, and is secured to the inner side member 20 of the frame.

I believe it is sufficiently obvious as not to require special illustration that if desired, for the purpose of reducing the cost of the device, the segment 38 can be omitted, and degree markings can be placed directly upon the inner side member 20, with the end member 26 being shiftable to selected angles denoted by the degree markings on said member 20.

Intermediate the end members 24, 26, a work-engaging clamp is mounted upon the inner side member 20. To this end, an angle bracket 42 is affixed to the inner side member 20, and secured to said bracket is a plate 44 disposed in a vertical plane and having an arcuate series of openings 50 formed therein.

An arm 46 is pivotally connected, at its inner end, to plate 44, the inner end of said arm having a cam surface 48 eccentric to the pivot axis of the arm. Said arm, intermediate its ends, has a laterally projected lug 49, engageable in any one of the openings 50, for holding the arm in selected positions to which it is swingably adjusted about its pivot axis.

A clamp bar 52 extends transversely of the inner side member 20, adjacent plate 44, and has a longitudinal series of apertures 54. Any selected opening 54 is adapted to receive an upwardly projecting lug 55 provided upon the inner side member 20, for retaining the clamp bar 52 in selected positions of adjustment transversely of the inner side member.

At one end, the clamp bar 52 has a depending extension 56 engageable against the side edge of the work piece B.

Figure 2:
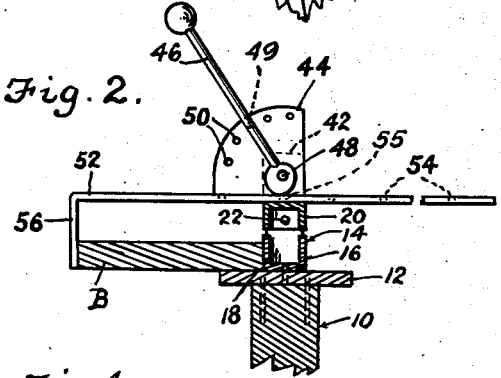
Figure 2 is an enlarged, fragmentary sectional view taken substantially on line 2—2 of Figure 1 and showing the work-engaging clamp.
Figure 3:
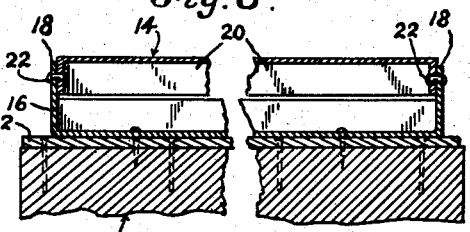
Figure 3 is a longitudinal sectional view, portions being broken away, taken substantially on line 3—3 of Figure 1, and illustrating the connection of the parallelogram frame to the base.
Figure 4:
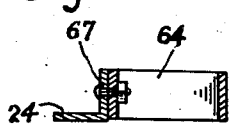
Figure 4 is an enlarged, detail sectional view taken on line 4—4 of Figure 1 and showing the connection of the slidable straight edge to its associated end member.
Figure 5:
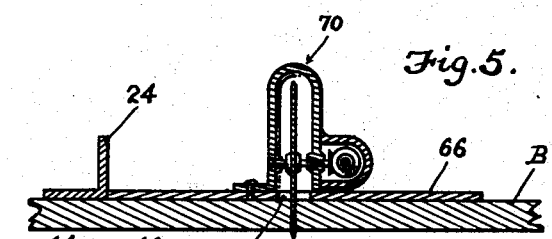
Figure 5 is an enlarged sectional view on line 5—5 of Figure 1 showing the engagement between the saw plate and its associated guide edge.

In use of the clamp, the arm 46, when swung upwardly from the position thereof shown in Figure 2, will release the clamp bar 52, so as to permit said bar 52 to be lifted off the lug provided upon inner side member 20. The clamp bar 52 can thus be disengaged from the work piece. When, however, the clamp bar is to be again engaged with a work piece, the extension 56 is positioned against the work piece and the arm 46 is swung downwardly. The cam surface 48 will thus bear downwardly upon the bar 52, so as to hold it rigidly in engagement with the work piece, and in this position of the parts, the arm 46 can be locked in place through the medium of engagement of its lug in a selected opening 50.

Figure 6:
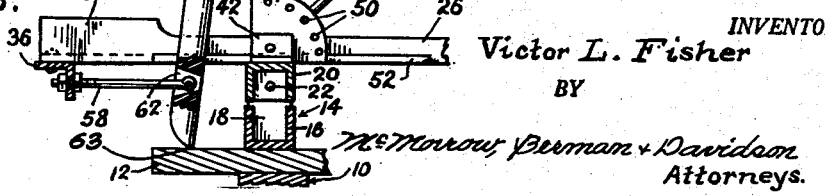
Figure 6 is an enlarged transverse sectional view on line 6—6 of Figure 1, showing the means for retaining the frame in its operative, work-engaging position.

Under some circumstances, the frame might tend to tilt out of the horizontal position thereof shown in Figure 6, while a piece of work is being cut. To prevent such undesired tilting of the frame, a frame-holding means is provided, said means being shown to particular advantage in Figure 6. A rod 58 is threaded at one end, the threaded end of the rod being extended through a smooth walled opening formed in the midlength portion of the outer side member 36. Lock nuts are threaded upon the rod 58, into engagement with opposite faces of said member 36, to hold the rod in selected positions to which it is adjusted transversely of the member 36.

The other end of the rod 58 is pivotally connected to a handle 60, said handle 60 having, adjacent its lower end, a transverse, tapered slot 62 into which said other end of the rod 58 extends. A pin is provided upon the handle 60, within slot 62, to pivotally connect the handle 60 to the rod 58.

At its lower end, handle 60 has a point 63 which is adapted to bite into the support piece 12 when the handle is swung in the direction of the arrows shown in Figure 6. This will prevent the frame from undesired tilting about the axis of its pivotal connection to the base 16, while work is being cut.

Means is also provided in the device for effecting bird's mouth cuts, and to this end, a triangular member 64 is attached to the end member 24. The member 64 has one leg 65 thereof extending normally to the associated end member 24, and it will be seen that when the end member 24 is adjusted to a selected angle relative to the work B, the straight edge 65 will correspondingly be adjusted, to provide a guide edge for a power saw, along which guide edge the power saw can be moved in making a bird's mouth cut.

In the widened portion 32 of end member 24 a longitudinal slot 67 is formed, and extending through said slot are screws that are connected to the triangular member 64.

It will thus be seen that the triangular member 64 can be slidably adjusted longitudinally of the end member 24 of the parallelogram frame, and when it has been shifted to a selected position of adjustment, the screws can be tightened to preserve the adjustment.

A rectangular, flat plate 66 is formed with a slot 68 through which can extend the blade of a conventional power saw 70. It will be understood, in this regard, that the power saw 70 will first be disconnected from the usual base plate provided thereon, after which the plate 66 will be attached to the power saw, in substitution for the conventional base plate of the saw.

It is important to note that the end members 24, 26, are integrally formed with longitudinal extensions projecting laterally of the parallelogram frame, beyond the pivot pins 28, 30 of said frame. Said extensions define guide edges for the power saw 70, the plate 66 being positioned against one of said guide edges in Figure 1.

In use of the device, the frame is first tilted about the axis of pins 22, in a counterclockwise direction as viewed in Figure 6. This raises the longitudinal extensions of the end members 24, 26, to permit insertion of a work piece B.

When the work piece has been properly positioned as shown in Figure 1, the frame is swung clockwise, to bring the extensions of the end members into engagement with the top surface of the work piece. Obviously, shims can be used under the work piece if necessary, to properly locate the work piece relative to the operatively positioned frame.

The clamp means shown in Figure 2 is engaged with the work, and the frame-holding means shown in Figure 6 is swung to a position in which it will prevent undesired tilting of the frame.

Previous to clamping of the work and locking of the frame in a horizontal position, the side and end members of the frame will, of course, be adjusted to selected angular relationships, through the medium of the protractor means 38, 40.

When the above steps have been carried out, the plate 66 can be positioned against one or the other end member, and the saw can then be shifted inwardly along its associated guide edge, to traverse the work and make the desired cut.

The length of the work will, of course, be governed through the use of suitable stops, not shown, conventionally employed by carpenters in cutting a number of work pieces to identical lengths.

The invention has certain important characteristics which, it is believed, are worthy of note. The entire structure can be readily formed from comparatively inexpensive materials, thereby to reduce the cost of manufacture. The structure further has the important characteristic of being light and readily portable, thereby to permit its use by home craftsmen. Still further, the design is such as to permit work pieces to be fed in succession into operative relationship to the frame, in minimum time, thereby to permit a large number of boards to be cut in a comparatively short time. Still further, the triangular member 64 is automatically properly positioned, when the parallelogram frame is adjusted, for making a bird's mouth cut of a proper angle, it being necessary only that the triangular member be adjusted longitudinally of its associated end member to a selected location.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. An adjustable power saw guide comprising a stationary base; a frame carried by said base, said frame including end members and side members pivotally connected at their ends to said end members, the several members forming a parallelogram, said end members including extensions projecting beyond said parallelogram to rest upon a work piece disposed at one side of the base, one of said side members being pivotally connected to the base for swinging movement about an axis extending longitudinally of said side member, for tilting of the frame about an axis extending transversely of the end members, thereby to swing said extensions upwardly and downwardly from a work piece lying horizontally alongside the base and disposed in contact along one of its edges with said side of the base, said pivotal connection of the side to the end members providing means for adjustment of the angular relationship which the side members bear to the end members; and clamp means carried by said one side member and projecting exteriorly of the parallelogram for clampably engaging the work piece along that edge of the work piece opposite the base-contacting edge thereof, said clamp means in the work-piece-clamping position thereof extending as a rigid element fixedly engaged both with the work piece and said one side member, and adapted to hold the work piece against movement relative to the base, thereby to be constituted as an aid tending to prevent tilting of the frame while the work piece is engaged by said clamp means.

2. An adjustable power saw guide comprising a stationary base; a frame carried by said base, said frame including end members and side members arranged to form a parallelogram, the side members being pivotally connected at their ends to said end members, the end members including extensions projecting exteriorly of the parallelogram so as to rest upon a workpiece disposed at one side of the base, one of said side members being pivotally connected to the base for swinging movement about an axis extending longitudinally of said side member, for tilting of the frame about an axis extending transversely of the end members, thereby to swing said extensions upwardly and downwardly from a work piece lying horizontally alongside the base and disposed in contact along one of its edges with said side of the base, said pivotal connection of the side to the end members providing means for adjustment of the angular relationship which the side members bear to the end members; and clamp means carried by said one side member for clampably engaging the work piece along that edge of the work piece opposite the base-contacting edge thereof, said clamp means in the work-piece-clamping position thereof extending as a rigid element fixedly engaged both with the work piece and said one side member, and adapted to hold the work piece against movement relative to the base, thereby to be constituted as an aid tending to prevent tilting of the frame while the work piece is engaged by said clamp means, said clamp means including a clamp bar adjustable transversely of said one side member and having means interengaging with said one side member in selected positions to which it is transversely adjusted for holding of the clamp bar in said selected positions, the clamp bar having one end projecting exteriorly of the parallelogram and having at said end a depending extension engageable against the last named edge of the work piece, and a cam element rotatably mounted upon said one side member above the clamp bar and adapted for rotation under the control of a user into engagement with the clamp bar, said cam element being adapted to bias the clamp bar against said one side member to lock the clamp bar and the side member against relative movement.

3. An adjustable power saw guide comprising a stationary base; a frame carried by said base, said frame including end members and side members arranged to form a parallelogram, the side members being pivotally connected at their ends to said end members, the end members including extensions projecting exteriorly of the parallelogram, said extensions being adapted to rest upon a work piece disposed at one side of the base, one of said side members being pivotally connected to the base for swinging movement about an axis extending longitudinally of said side member, for tilting of the frame about an axis extending transversely of the end members, thereby to swing said extensions upwardly and downwardly from a work piece lying horizontally alongside the base and disposed in contact along one of its edges with said side of the base, said pivotal connection of the side to the end members providing means for adjustment of the angular relationship which the side members bear to the end members; and clamp means carried by said one side member for clampably engaging the work piece along that edge of the work piece opposite the base-contacting edge thereof, said clamp means in the work-piece-clamping position thereof extending as a rigid element fixedly engaged both with the work piece and said one side member, and adapted to hold the work piece against movement relative to the base, thereby to be constituted as an aid tending to prevent tilting of the frame while the work piece is engaged by said clamp means, said clamp means including a clamp bar adjustable transversely of said one side member and having means interengaging with said one side member in selected positions to which it is transversely adjusted for holding of the clamp bar in said selected positions, the clamp bar having one end projecting exteriorly of the parallelogram and having at said end a depending extension engageable against the last named edge of the work piece, and a cam element rotatably mounted upon said one side member above the clamp bar and adapted for rotation under the control of a user into engagement with the clamp bar, said cam element being adapted to bias the clamp bar against said one side member to lock the clamp bar and the side member against relative movement, said clamp means further including a handle rigid with said cam element and extending radially of the axis of rotation of the cam element, said handle including a lug intermediate its ends, and a segmental lock plate having a fixed connection to said one side member and formed with an arcuate series of apertures extending about said axis of rotation of the cam element, said lug being engageable in any of said apertures to lock the cam element in selected positions to which it is rotated.

4. An adjustable power saw guide comprising a stationary base; a frame carried by said base, said frame including end members and side members arranged as a parallelogram, the side members being pivotally connected at their ends to said end members, the end members including extensions projecting exteriorly of the parallelogram so as to rest upon a workpiece lying horizontally with one of its edges contacting the base, one of said side members being pivotally connected to the base for swinging movement about an axis extending longitudinally of said side member, for tilting of the frame about an axis extending transversely of the end members, thereby to swing said extensions upwardly and downwardly from said work piece, said pivotal connection of the side to the end members providing means for adjustment of the angular relationship which the side members bear to the end members; and means to prevent tilting of the frame during the cutting of said work piece, including a rod secured to the other side member of the frame and extending inwardly of the parallelogram from said other side member, and a handle pivotally connected intermediate its ends to the inwardly extended end of the rod, said handle having a point at one end adapted to bite into a support piece on which the base is mounted, on swinging of the handle about the axis of its pivotal connection to said rod.

References Cited in the file of this patent

UNITED STATES PATENTS

| | | |
|---|---|---|
| 1,147,063 | Wilson | July 20, 1915 |
| 1,700,189 | Wikstrom | Jan. 29, 1929 |
| 1,911,045 | Tinnen | May 23, 1933 |
| 2,613,707 | Giles | Oct. 14, 1952 |
| 2,627,287 | McCluskey | Feb. 3, 1953 |